UNITED STATES PATENT OFFICE.

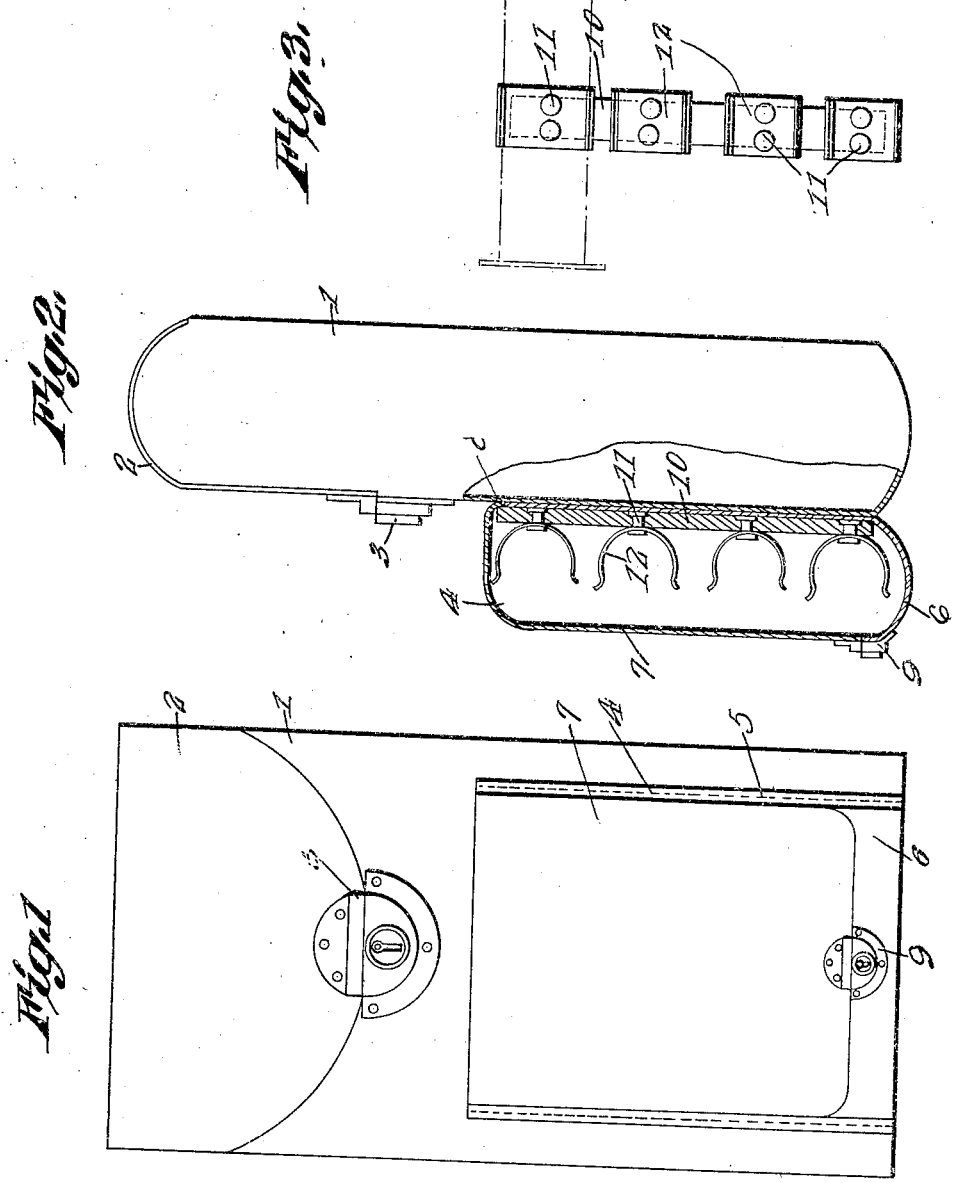

ROBERT LE ROY ATWELL, OF ATLANTA, GEORGIA.

COMBINATION CAMERA AND FILM CASE.

1,354,011.  Specification of Letters Patent.  Patented Sept. 28, 1920.

Application filed November 28, 1917. Serial No. 204,425.

*To all whom it may concern:*

Be it known that I, ROBERT L. ATWELL, a citizen of the United States, residing at Atlanta, in the county of Fulton and State of Georgia, have invented a new and useful Combination Camera and Film Case, of which the following is a specification.

The object of this invention is a combination case for holding a camera and films, and the objects of the invention are, first, to provide a camera case with compartments for containing films, second, to provide means for holding individual film rolls in the film case, third, to provide a simple, durable, and efficient camera and film case.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing wherein:—

Figure 1 is a view in front elevation of a case constructed in accordance with the invention;

Fig. 2 is a side elevation partly in section;

Fig. 3 is a front elevation of the film rack.

Referring to the drawing by numerals of reference.

In carrying out the invention the usual camera case is provided, preferably made of leather and having a body 1 closed by the preferably integral flap 2. The flap 2 may be locked in closed position by any suitable and preferred form of lock 3.

Secured to the front of the camera case is the film case which consists of sides 4, formed preferably of heavy leather and stitched to the main case as indicated at 5. To the lower ends of the sides 4 is secured the bottom 6.

While the bottom 6 is here shown as curved transversely it is understood that the same, together with the bottom of the main case may form a continuous flat surface if desired.

A flap 7, opening upwardly, is stitched along one end, 8, to the face of the main case 1. This flap 7 may be secured in closed position by any usual form of latch or lock 9.

Within the film case, and secured to the front of the main case 1 is a strip of heavy leather 10 or the like to which are secured by rivets 11 a plurality of arcuate resilient clips 12 which are adapted to partially embrace and hold film rolls. These rolls may be stored in the film case and removed as desired for use. The strip 10 is spaced at its sides from the sides 4, thus to form channels designed to receive the flanges of the spools containing the films, thus allowing the films to fit snugly within the clips 12.

Having thus described the invention, what is claimed as new and sought for by Letters Patent, is:—

The combination with a camera case, of a case for holding films comprising a back strip of substantial thickness secured on one face of the camera case, sides secured to said face of the camera case and spaced from said back strip to provide channels for the reception of the end flanges of film spools, a flexible member constituting the top and a portion of the front of the film case and secured at one end between the camera case and the back strip of the film case, a flexible member constituting the bottom and a portion of the front of the film case and secured at one end between the camera case and the back strip of the film case, means for detachably connecting said flexible members, said members, when detached from each other, being adapted to move apart and into the same plane with the back strip of the film case to expose the entire interior of said case, and a series of alining spring clips secured to the back strip of the film case along the center thereof to hold a series of parallel film rolls transversely within the film case.

In testimony that I claim the foregoing as my own, I have hereto fixed my signature in the presence of two witnesses.

ROBERT LE ROY ATWELL.

Witnesses:
 JAMES W. HUBBARD,
 ALBERT PARIS HILL.